(12) United States Patent
Fiennes et al.

(10) Patent No.: US 7,143,102 B2
(45) Date of Patent: Nov. 28, 2006

(54) AUTOGENERATED PLAY LISTS FROM SEARCH CRITERIA

(75) Inventors: Hugo Fiennes, Cambridge (GB); Roger Lipscombe, Cambridge (GB)

(73) Assignee: Sigmatel, Inc., Austin, TX (US)

( * ) Notice: Subject to any disclaimer, the term of this patent is extended or adjusted under 35 U.S.C. 154(b) by 341 days.

(21) Appl. No.: 09/967,793

(22) Filed: Sep. 28, 2001

(65) Prior Publication Data

US 2003/0065639 A1    Apr. 3, 2003

(51) Int. Cl.
*G06F 17/30* (2006.01)
(52) U.S. Cl. .................. 707/102; 707/100; 707/101; 707/103 R; 707/104.1
(58) Field of Classification Search .............. 707/102, 707/100, 101, 103 R, 104.1
See application file for complete search history.

(56) References Cited

U.S. PATENT DOCUMENTS

| | | | |
|---|---|---|---|
| 5,265,248 A * | 11/1993 | Moulios et al. ............. 718/100 |
| 5,454,106 A * | 9/1995 | Burns et al. ................... 707/4 |
| 5,630,005 A | 5/1997 | Ort et al. |
| 5,751,672 A * | 5/1998 | Yankowski ................. 709/238 |
| 5,808,224 A | 9/1998 | Kato |
| 5,947,746 A | 9/1999 | Tsai |
| 5,969,283 A | 10/1999 | Looney et al. |
| 5,987,525 A | 11/1999 | Roberts et al. |
| 6,038,199 A | 3/2000 | Pawlowski et al. |
| 6,225,546 B1 | 5/2001 | Kraft et al. |
| 6,248,946 B1 | 6/2001 | Dwek |
| 6,252,830 B1 | 6/2001 | Hsu |
| 6,278,048 B1 | 8/2001 | Lee |
| 6,289,165 B1 | 9/2001 | Abecassis |
| 6,324,537 B1 | 11/2001 | Moran |
| 6,349,797 B1 * | 2/2002 | Newville et al. ........... 187/396 |
| 6,389,467 B1 | 5/2002 | Eyal |
| 6,423,892 B1 | 7/2002 | Ramaswamy |
| 6,446,080 B1 | 9/2002 | Van Ryzin et al. |
| 6,452,609 B1 * | 9/2002 | Katinsky et al. ............. 715/716 |
| 6,484,156 B1 * | 11/2002 | Gupta et al. ................... 707/1 |
| 6,496,802 B1 | 12/2002 | van Zoest et al. |
| 6,505,160 B1 * | 1/2003 | Levy et al. .................. 704/270 |
| 6,519,648 B1 * | 2/2003 | Eyal ........................... 709/231 |
| 6,526,411 B1 * | 2/2003 | Ward .......................... 707/102 |
| 6,587,835 B1 | 7/2003 | Treyz et al. |
| 6,590,303 B1 | 7/2003 | Austin et al. |
| 6,662,231 B1 * | 12/2003 | Drosset et al. .............. 709/229 |
| 6,670,934 B1 * | 12/2003 | Muoio et al. ................. 345/1.1 |
| 6,693,236 B1 | 2/2004 | Gould et al. |
| 6,701,355 B1 * | 3/2004 | Brandt et al. ............... 709/219 |
| 6,718,308 B1 * | 4/2004 | Nolting ...................... 704/275 |
| 6,771,568 B1 * | 8/2004 | Hochendoner ........... 369/30.06 |
| 6,850,252 B1 | 2/2005 | Hoffberg |
| 6,965,770 B1 * | 11/2005 | Walsh et al. .............. 455/426.1 |
| 6,996,390 B1 * | 2/2006 | Herley et al. ............... 455/345 |
| 2002/0002039 A1 * | 1/2002 | Qureshey et al. ........... 455/344 |
| 2002/0045960 A1 * | 4/2002 | Phillips et al. ................. 700/94 |

(Continued)

*Primary Examiner*—Frantz Coby
(74) *Attorney, Agent, or Firm*—Toler Schaffer LLP

(57) ABSTRACT

A method and apparatus for automatically creating a play list from search criteria. A user inputs at least one search parameter for a store of music files. The player then builds a search query from the search parameter and any other search parameters entered. The query is stored in such a manner that the query is associated with a particular play list name. When the user desires to play that play list, the entry of the play list name causes the query to be executed and a list of objects is obtained. The list of objects may in turn contain other queries, which are then executed as well.

20 Claims, 2 Drawing Sheets

U.S. PATENT DOCUMENTS

| | | |
|---|---|---|
| 2002/0055934 A1 | 5/2002 | Lipscomb et al. |
| 2002/0069218 A1* | 6/2002 | Sull et al. ................ 707/501.1 |
| 2002/0151327 A1 | 10/2002 | Levitt |
| 2002/0152876 A1 | 10/2002 | Hughes et al. |
| 2002/0171567 A1 | 11/2002 | Altare et al. |
| 2003/0050058 A1* | 3/2003 | Walsh et al. ................ 455/426 |
| 2003/0236711 A1* | 12/2003 | Deguchi ..................... 705/26 |
| 2004/0002310 A1* | 1/2004 | Herley et al. ............ 455/179.1 |
| 2005/0108413 A1* | 5/2005 | Melmon ..................... 709/231 |
| 2005/0262528 A1* | 11/2005 | Herley et al. ................ 725/19 |
| 2006/0004948 A1* | 1/2006 | Grace et al. ................ 711/100 |
| 2006/0008256 A1* | 1/2006 | Khedouri et al. ........... 386/124 |
| 2006/0112144 A1* | 5/2006 | Ireton ..................... 707/104.1 |

* cited by examiner

FIGURE 3
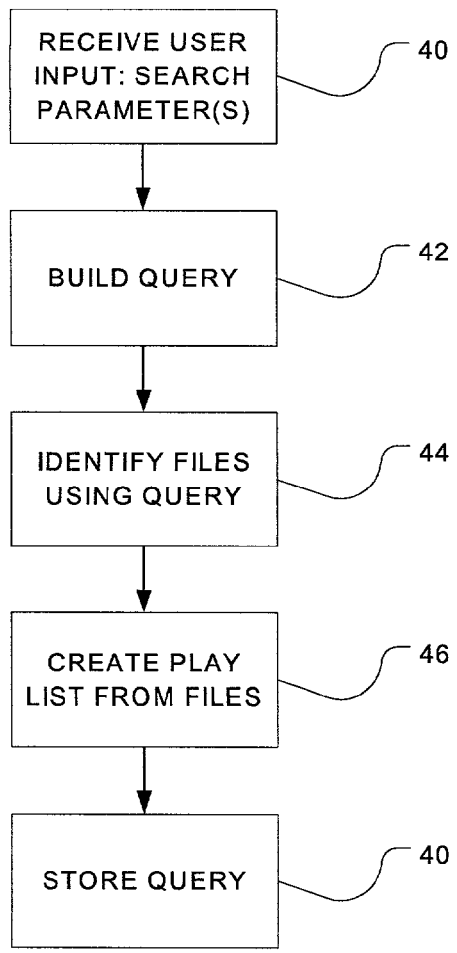
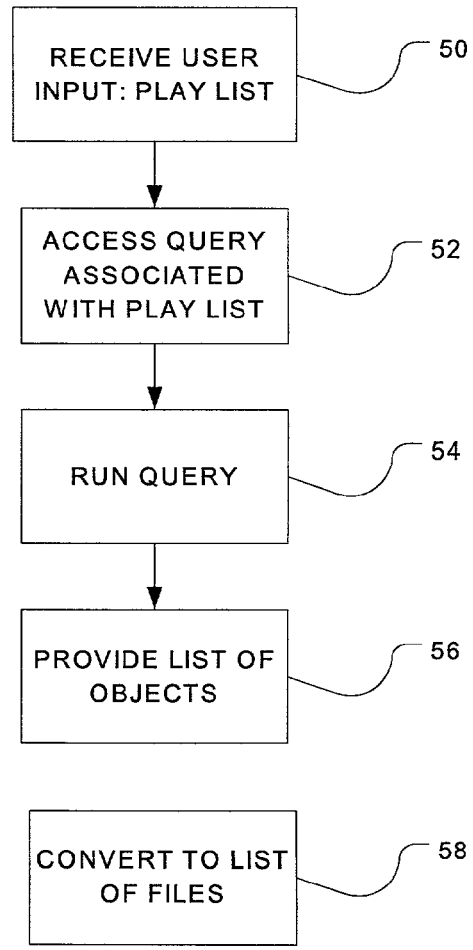
FIGURE 4

AUTOGENERATED PLAY LISTS FROM SEARCH CRITERIA

BACKGROUND

1. Field

This disclosure relates to digital music devices, more particularly to methods for managing play lists in those music devices.

2. Background

With the advent of digital music devices, such as MP3 (Moving Pictures Experts Group, Audio Layer 3) players, users now have many configuration features available to them. Digital music players produce music from digital files stored in a memory on the player. The digital files are generally downloaded to the player from a host computer or network while the player is in communication with the host. The player may be portable, a home music system or mounted in a vehicle, as examples.

Many manufacturers of these types of players have made management of the music on the devices more user-friendly. Since the player has to be connected to a host computer or network, many of the players rely upon the intelligence of the host to configure their player. Configuration choices, such as selection of music to be loaded onto the player, as well as various means for organizing the music, are now available to these users through the host.

Play lists allow users to organize their music into 'themed' lists, such as by artist, year or type of music. Typically, users build a play list by manually selecting the appropriate files from their music selection. In some instances, users can sort their music files by a certain attribute. This may allow the selection of the files more convenient. The play lists are typically created on the host and the files are then downloaded into the player.

Some larger players, such as those in the home or in a vehicle, may have the capability to allow the user to create play lists on the player. Once the user has selected the files for a certain play list, the play list is saved. The user can then select this play list in the future.

When the player executes a play list, it plays all of the song in the list residing on the player. If new music is added to the player, the user must manually update the play list to include the new files. If the user does not remember the criteria used to create the play list, the user may have to recreate the list manually. Both of these processes are inconvenient, and even more so if the user has to reconnect to the host computer or network to perform these tasks.

It would be useful to allow users to perform these types of functions on the player and to store the play list criteria in such a manner as to automatically update them.

SUMMARY

One aspect of the disclosure is a method for automatically creating a play list from search criteria. A user inputs at least one search parameter for a store of music files. The player then builds a search query from the search parameter and any other search parameters entered. The query is stored in such a manner that the query is associated with a particular play list name. When the user desires to play that play list, the entry of the play list name causes the query to be executed and a list of objects is obtained. The list of objects may in turn contain other queries, which are then executed as well. The end result is a list of music files to be played.

BRIEF DESCRIPTION OF THE DRAWINGS

The invention may be best understood by reading the disclosure with reference to the drawings, wherein:

FIG. 3 shows a flowchart of one embodiment of a method to provide automatically generated play lists from search criteria, in accordance with the invention.

FIG. 4 shows a flowchart of one embodiment of a method to automatically update a play list from a stored query, in accordance with the invention.

DETAILED DESCRIPTION OF THE EMBODIMENTS

Figure 1:
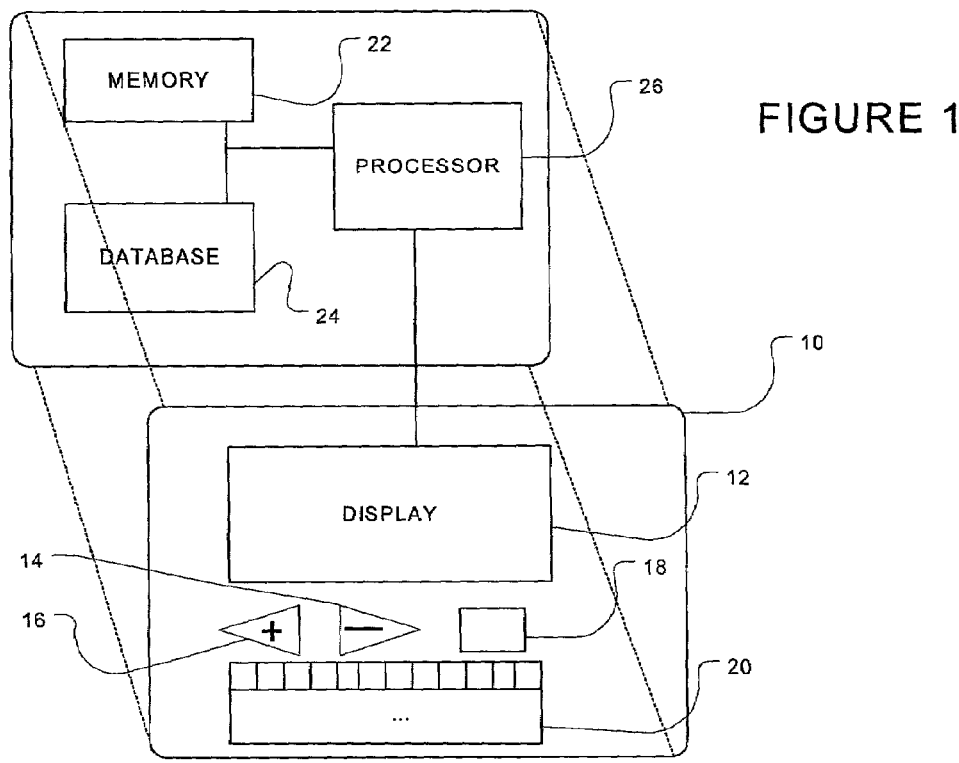
FIG. 1 shows a digital audio device, in accordance with the invention.

FIG. 1 shows one example of a digital music player. The player could be a home player, such as would be found as part of a home sound system, a vehicular system such as a car or boat music system, or a portable player. Depending upon the environment for which the player is intended, various features and options may differ from one player to the next. However, typically a player in accordance with the invention will have some minimum components as shown in FIG. 1.

The player 10 has a panel upon which is a user interface, shown here as comprising a display 12, control buttons 14, 16 and 18 and possibly having an alphanumeric keypad 20. The control buttons may be of many different types, including push buttons, radio dials or sliders, although push buttons are shown here. The control buttons allow the user to control the playing of the music as well as to respond to items on the display 12.

The player typically has some sort of processor 26 that manages the user interface, accesses the music files and performs the necessary conversion to turn the digital information stored in the file into audio signals. Players also typically either have speakers or a headphone jack, not shown here. The processor accesses the files from the memory 22. In one embodiment of the invention, the files are organized into a database 24, which may reside in a separate memory or may be a portion of the same memory that stores the music files. For purposes of this discussion, and greater ease in understanding the invention, the database will be referred to here as a separate entity from the memory in which the music files are stored.

The database 24 generally comprises a list of the names of the music files and at least one field that defines an attribute of those files. For example, the database may have a list of files and the recorded year. The database can be searched by either the name or the year. The example of recorded year is merely intended to be illustrative. Many other attributes may be used, including multiple attributes per file.

The database of music files also provides the capability for the user to define and save play lists in a more automated fashion. Currently, users typically have to specify each file that is to be added to a play list. For example, Creative Labs™ has a product it includes with some of its digital music players, referred to as a 'jukebox.' Similarly, RealNetworks™ has a product that can be downloaded from their web site titled 'RealJukebox™.' These products allow users to organize their music files into play lists for easy access later, but very little automation is provided for organizing these play lists.

For example, a user wants to create a play list. In some instances, the user must access the jukebox view on a PC or other host. The user selects from a series of pull-down menus and option buttons. A typically process would be as follows. The user selects "Create Play List" from a list of options and then is prompted to provide a name for the play list. The user then goes through the entire music collection available that the jukebox application has been able to locate on the host and manually selects the files to be added to the new play list. Once finished, the user then selects an option such as 'Add to Play List.' The play list is then created from those files.

If the user wants to add other tracks to the play list, the user has to manually sort through the music collection again and select files to be added. If new music has been added to the PC or the player, the user may have to manually compare the current play list to the possible files to determine if the play list is up to date with the new music on the PC or player. This is inconvenient and time consuming.

Figure 2:
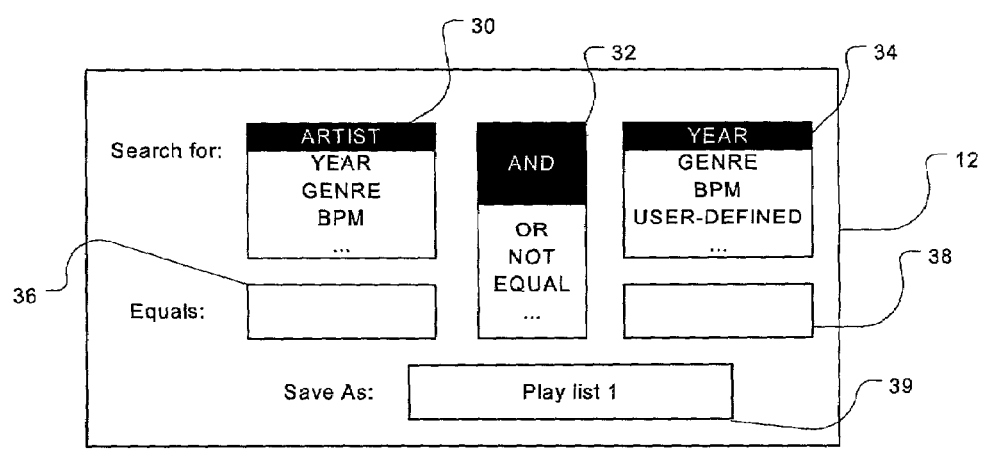
FIG. 2 shows one embodiment of a user interface allowing a user to enter search criteria, in accordance with the invention.

Using the player of FIG. 1, however, it is possible to provide users with a user interface that allows them to automate the search and selection process. Further, it provides a process by which the automated search and selection process can be stored in a query format. Referring now to FIGS. 2 and 3, a possible user interface facilitating the methods of the invention can be discussed. It should be noted that the examples below discuss the user interface as being on the player. It is also possible that the user interface is located on the host, either a computer or network, as examples.

In FIG. 3, at 40, the process begins with reception of a user input. The user input is comprised of at least one search parameter. This can be seen by referring to FIG. 2. The display 12 now has several windows from which the user can make selections. This is an example of the player receiving the user input directly. Alternatively, the user may make selections on a host that are then transferred to the player. For example, the player is prompting the user to "Search For:" and then provides a list of parameters in window 30. The user in this example has selected the search terms "artist" as a first search term. The user can then enter the artist's name in window 36, or the player may provide a list of available artists on the player from which the user can select.

If the user wishes to refine the search further, the user may make a selection that is joined with the current search parameter by one of any number of operators. In the example of FIG. 2, the user has also selected "and year." This will result in a list of files from a specified artist recorded in a specific year. For example, selecting "Eric Clapton" and "1977" will return a play list of all music files on the player that were originally recorded by Eric Clapton in 1977.

As can be seen in FIG. 3, the player builds a query from the user's entries from the user interface. The user interface may not provide the operators in such a manner. Other types of user interfaces may be used, including a natural language entry, voice recognition entry, point and drill type interfaces, among many others. The player would then parse the entries into a search query, such as <Artist="Clapton":AND: year=1977>.

It must be noted that the next stages of identifying the files using the query at 46 and the play list created from the files at 46 in FIG. 3 are optional. The user does not need to actually execute the query for it to be stored. Executing the query will be discussed in more detail with regard to FIG. 4. At 48, the player stores the query as being associated with whatever play list name the user specifies, such as that in window 39 of FIG. 2. The play list of files may never be created, unlike the current state of the art. The play list is actually stored in terms of the query built from the parameters. This has several advantages.

One advantage of this approach is the ability for the player to dynamically update the play list as new music is added to the player. As discussed previously, the addition of new music would require the user to go through the new music and determine to which play lists the new files would need to be added to update those play lists. In the embodiment of the invention discussed above, there is no inflexible list of files that are designated as the play list. If the query is run, and the new files meet the criteria in the query, the files will be part of the play list.

This is shown in FIG. 4. When the user decides to play a play list, in one embodiment of the invention, the user is actually identifying a query to be executed on the database. The user provides the play list name as an input at 50. The player accesses the query associated with that play list name at 52 and runs the query at 54. Running the query results in a list of objects at 56 where the objects are identified as having meet the requirements of the query. These files are then set up to be played as the play list. This process is transparent and the user may not even be aware that the play list that the user had set up exists only in query form.

The query itself may be a combination of queries. For example, the user may set up play list 1 with the specifications of artist A and year 2000. Play list 2 may have the files corresponding to music by artist B. Through the user interface, the user may create play list 3 as being play list 1 and play list 2. The player would interpret play list one as being Play list 3 would be stored in some manner that would combine the two queries, such as <<Artist="A":AND: year=2000>+<Artist="B">>. The player would 'flatten' the queries and provide a list of files. It should be noted that this last operation will more than likely be two operations, as to state Artist=A and Artist=B would be mutually exclusive. The operations will more than likely be concatenated, indicated above with the "+" sign.

Because of the ability to have multi-level queries, the list of objects may not be a list of files for immediate playing. Instead the list of objects provided at 56 may comprise an intermediate step. When the individual objects are all flattened or converted into the list of music files, the list of files would be provided at 58. Again, this may be an optional and unnecessary step, if no multi-level queries are stored as play lists. More detail can be found on multi-level, or hierarchical, play lists in copending U.S. patent application Ser. No. 09/595,818, filed Jul. 16, 2000, entitled "Digital Music Systems", incorporated by reference herein.

In this manner, the users are provided an automated method to identify files for particular play lists. The method allows for dynamic updating of the specified files in a particular play list, transparent to the user. It also allows the storage of the play lists in terms of a query rather than an entire list of files.

Thus, although there has been described to this point a particular embodiment for a method and apparatus for automatically generating play lists from search criteria in music players, it is not intended that such specific references be considered as limitations upon the scope of this invention except in-so-far as set forth in the following claims.

What is claimed is:

1. A method comprising:
receiving, via a user interface of a portable audio playback device, user input selections related to one or more audio file query parameters;
generating an audio file search query based on the user input selections;
storing the audio file search query at the portable audio playback device;
automatically generating, at the portable audio playback device, a first playlist of audio files selected from a database of audio files based on the audio file search query;
adding a first audio file to the database of audio files subsequent to generating the first playlist;
automatically generating, at the portable audio playback device, a second playlist of audio files subsequent to adding the first audio file, wherein the second playlist of audio files is selected from the database of audio files based on the audio file search query, wherein the second playlist of audio files identifies a subset of the database of audio files, wherein the second playlist of audio files includes the first audio file, and wherein the second playlist of audio files is modified with respect to the first playlist of audio files;
removing a second audio file from the database of audio files subsequent to generating the second playlist;
automatically generating, at the portable audio playback device, a third playlist of audio files subsequent to removing the second audio file, wherein the third playlist of audio files is selected from the database of audio files based on the audio file search query, wherein the third playlist of audio files identifies a subset of the database of audio files, wherein the third playlist of audio files does not include the second audio file, wherein the third playlist of audio files is automatically generated subsequent to the second playlist of audio files, wherein the third playlist of audio files includes the first audio file, and wherein the third playlist of audio files is modified with respect to the second playlist of audio files; and
providing a representation of at least one of the second playlist or the third playlist for navigation by a user of the portable audio playback device.

2. A method comprising:
generating an audio file search query based on user input selections related to one or more audio file query parameters;
storing the audio file search query at a portable audio playback device;
automatically generating, at the portable audio playback device, a first playlist of audio files selected from a database of audio files based on the audio file search query;
adding a first audio file to the database of audio files subsequent to generating the first playlist; and
automatically generating, at the portable audio playback device, a second playlist of audio files subsequent to adding the first audio file;
wherein the second playlist of audio files is selected from the database of audio files based on the audio file search query;
wherein the second playlist of audio files identifies a subset of the database of audio files; and
wherein the second playlist of audio files includes the first audio file.

3. The method of claim 2, further comprising:
removing a second audio file from the database of audio files subsequent to generating the first playlist;
generating, at the portable audio playback device, a third playlist of audio files subsequent to removing the second audio file;
wherein the third playlist of audio files is selected from the database of audio files based on the audio file search query;
wherein the third playlist of audio files identifies a subset of the database of audio files; and
wherein the third playlist of audio files does not include the second audio file.

4. The method of claim 3, wherein:
the third playlist is automatically generated subsequent to the second playlist of audio files; and
the third playlist includes the first audio file.

5. The method of claim 3, wherein the third playlist is automatically generated prior to generating the second playlist of audio files.

6. The method of claim 2, wherein the second playlist of audio files is modified with respect to the first playlist of audio files.

7. The method of claim 2, further comprising:
providing a representation of the second playlist for navigation by a user of the portable audio playback device.

8. The method of claim 2, further comprising:
receiving the user input selections via a user interface of the portable audio playback device.

9. The method of claim 2, wherein generating the audio file search query includes parsing the user input selections to generate a query string.

10. A method comprising:
generating an audio file search query based on user input selections related to one or more audio file query parameters;
storing the audio file search query at a portable audio playback device;
automatically generating, at the portable audio playback device, a first playlist of audio files selected from a database of audio files based on the audio file search query;
removing a first audio file from the database of audio files subsequent to generating the first playlist; and
automatically generating, at the portable audio playback device, a second playlist of audio files subsequent to removing the first audio file;
wherein the second playlist of audio files is selected from the database of audio files based on the audio file search query; and
wherein the second playlist of audio files does not include the first audio file.

11. A computer readable medium embodying a set of executable instructions, the set of executable instructions comprising:
instructions to manipulate a processor to generate an audio file search query based on user input selections related to one or more audio file query parameters;
instructions to manipulate the processor to store the search query at a portable audio playback device;
instructions to manipulate the processor to automatically generate, at the portable audio playback device, a first playlist of audio files selected from a database of audio files based on the audio file search query;

instructions to manipulate the processor to add a first audio file to the database of audio files subsequent to generating the first playlist; and instructions to manipulate the processor to automatically generate, at the portable audio playback device, a second playlist of audio files subsequent to adding the first audio file to the database of audio files;

wherein the second playlist of audio files is selected from the database of audio files based on the audio file search query; and wherein the second playlist of audio files includes the first audio file.

12. The computer readable medium of claim 11, wherein the set of executable instructions are stored in a memory of the portable audio playback device and wherein the processor comprises a processing device of the portable audio playback device.

13. The computer readable medium of claim 11, wherein the set of executable instructions further comprises:

instructions to manipulate the processor to remove a second audio file from the database of audio files subsequent to generating the first playlist; and instructions to manipulate the processor to generate, at the portable audio playback device, a third playlist of audio files subsequent to removing the second audio file;

wherein the third playlist of audio files is selected from the database of audio files based on the audio file search query; and wherein the third playlist of audio files does not include the second audio file.

14. A portable audio playback device comprising:

a processor;

a memory to store a set of executable instructions, the set of executable instructions comprising:

instructions manipulate the processor to generate an audio file search query based on user input selections related to one or more audio file query parameters;

instructions to manipulate the processor to store the audio file search query;

instructions to manipulate the processor to generate a first playlist of audio files selected from a database of audio files based on the audio file search query;

instructions to manipulate the processor to add a first audio file to the database of audio files subsequent to generating the first playlist; and instructions to manipulate the processor to generate a second playlist of audio files subsequent to adding the first audio file;

wherein the second playlist of audio files is selected from the database of audio files based on the audio file search query; and wherein the second playlist of audio files includes the first audio file.

15. The portable audio playback device of claim 14, wherein the set of executable instructions further comprises:

instructions to manipulate the processor to remove a second audio file from the database of audio files subsequent to generating the first playlist; and instructions to manipulate the processor to generate a third playlist of audio files subsequent to removing the second audio file;

wherein the third playlist of audio files is selected from the database of audio files based on the audio file search query; and wherein the third playlist of audio tiles does not include the second audio file.

16. The method of claim 1, wherein the user input selections identify the one or more audio file query parameters.

17. The method of claim 2, further comprising providing a representation of the second playlist for navigation by a user of the portable audio playback device.

18. The method of claim 10, further comprising providing a representation of at least one of the first playlist and the second playlist for navigation by a user of the portable audio playback device.

19. The computer readable medium of claim 11, wherein the set of executable instructions further comprises instructions to manipulate the processor to provide a representation of at least one of the first playlist and the second playlist for navigation by a user of the portable audio playback device.

20. The portable audio playback device of claim 14, wherein the set of executable instructions further comprises instructions to manipulate the processor to provide at least one of the first playlist of audio files and the second playlist of audio files for navigation by a user of the portable audio playback device.

* * * * *